(12) United States Patent
Schulz et al.

(10) Patent No.: US 8,534,396 B2
(45) Date of Patent: Sep. 17, 2013

(54) TRACTOR PTO DRIVE LINE

(75) Inventors: Guillaume Schulz, Beauvais (FR);
Vincent Hedin, Beauvais (FR)

(73) Assignee: Agco SA, Beauvais (FR)

(*) Notice: Subject to any disclaimer, the term of this patent is extended or adjusted under 35 U.S.C. 154(b) by 317 days.

(21) Appl. No.: 13/062,029

(22) PCT Filed: Sep. 3, 2009

(86) PCT No.: PCT/EP2009/061393
§ 371 (c)(1),
(2), (4) Date: May 3, 2011

(87) PCT Pub. No.: WO2010/026183
PCT Pub. Date: Mar. 11, 2010

(65) Prior Publication Data
US 2011/0232979 A1  Sep. 29, 2011

(30) Foreign Application Priority Data
Sep. 5, 2008 (GB) .................. 0816223.2

(51) Int. Cl.
*B60K 25/06* (2006.01)
(52) U.S. Cl.
USPC .................. 180/53.6; 74/11; 74/15.4
(58) Field of Classification Search
USPC ............... 180/53.6, 53.61, 53.62, 53.7, 53.8; 74/11, 15.4, 15.6; 403/322.2
See application file for complete search history.

(56) References Cited

U.S. PATENT DOCUMENTS 2,756,831 A * 7/1956 Mitchell ................. 180/14.1
3,352,165 A * 11/1967 Lee ........................ 74/15.4
(Continued)

FOREIGN PATENT DOCUMENTS
GB  2056618 A  3/1981
GB  2219372 A  12/1989

OTHER PUBLICATIONS

WO2010/026183-A3 PCT Search Report for PCT/EP/2009/061393 published Mar. 11, 2010.
(Continued)

*Primary Examiner* — Paul N Dickson
*Assistant Examiner* — Timothy Wilhelm

(57) ABSTRACT

A tractor power take-off drive line having an output shaft (11) with a socket (12) within which a removeable PTO stub shaft (13) is drivingly received. The stub shaft is retained in the socket by radially moveable retaining members (16) housed in the output shaft and moveable between a radially inward retaining position in which the retaining members each projecting into the socket (12) to engage a retaining formation (18) in the stub shaft (13) within the socket and a radially outward releasing position in which the retaining members are free to move radially outwardly relative to the socket to disengage the retaining formation and allow the stub-shaft to be removed from the socket. The retaining members (16) are moved between their retaining and releasing positions by an actuating sleeve (19, 29) which is axially slidable on the output shaft (11) by a tractor operator between a first retaining position in which a first stub shaft designed to be driven at a first output speed is retained in position in the socket, a second retaining position in which a second stub shaft designed to be driven at a second output speed is retained in position in the socket, and a third releasing position in which the retaining members are allowed to move to their releasing positions. The sleeve (19, 29) carries first and second PTO shaft speed indicating formations which are respectively designed to be aligned with a speed sensor (32) when the sleeve is in its first and second stub shaft retaining positions respectively.

5 Claims, 4 Drawing Sheets

(56) References Cited

U.S. PATENT DOCUMENTS

| | | | | |
|---|---|---|---|---|
| 3,464,277 A | * | 9/1969 | Longshore | 74/15.4 |
| 4,318,630 A | * | 3/1982 | Herchenbach et al. | 403/322.2 |
| 4,722,234 A | * | 2/1988 | Greene et al. | 74/15.4 |
| 4,960,344 A | * | 10/1990 | Geisthoff et al. | 403/316 |
| 5,667,330 A | * | 9/1997 | Henkel et al. | 403/328 |
| 6,038,936 A | * | 3/2000 | Butkovich et al. | 74/15.4 |
| 6,129,187 A | * | 10/2000 | Bellanger et al. | 192/3.58 |
| 6,250,414 B1 | * | 6/2001 | Sato et al. | 180/307 |
| 7,874,222 B2 | * | 1/2011 | Steele et al. | 74/15.4 |

OTHER PUBLICATIONS

UK Search Report for GB0816223.2 dated Jan. 6, 2009.

* cited by examiner

TRACTOR PTO DRIVE LINE

This invention relates to a tractor Power Take-Off (PTO) drive line in which a PTO stub shaft projects from the front or rear of a tractor to drive implements located in front of or behind the tractor.

It is well know to have different stub shafts which are designed to be driven at different speeds. For example, a stub shaft with six driving splines is typically designed to be driven at 540 r.p.m and a stub shaft with twenty-one driving splines is designed to be driven at 1000 r.p.m thus avoiding driving an implement at the wrong operating speed.

It is also known to make such shafts interchangeable to that a range of implements designed to operate at both 540 r.p.m and 1000 r.p.m can be driven from the tractor.

It is an object of the present invention to provide a PTO drive line which has easily interchangeable stub shafts designed to be driven at different speeds and which provides an indication if the speed at which the stub shaft is rotating.

Thus according to the present invention there is provided a tractor PTO drive line having an output shaft with a socket within which a removeable PTO stub shaft is drivingly received, the stub shaft being retained in the socket by radially moveable retaining members housed in the output shaft and moveable between a radially inward retaining position in which the retaining members each projecting into the socket to engage a retaining formation in the stub shaft within the socket and a radially outward releasing position in which the retaining members are free to move radially outwardly relative to the socket to disengage the retaining formation and allow the stub shaft to be removed from the socket, the retaining members being moved between their retaining and releasing positions by an actuating sleeve which is axially slidable on the output shaft by a tractor operator between a first retaining position in which a first stub shaft designed to be driven at a first output speed is retained in position in the socket, a second retaining position in which a second stub shaft designed to be driven at a second output speed is retained in position in the socket, and a third releasing position in which the retaining members are allowed to move to their releasing positions, the sleeve carrying first and second PTO shaft speed indicating formations which are respectively designed to be aligned with a speed sensor when the sleeve is in its first and second stub shaft retaining positions respectively.

Such a drive line not only provides easy interchangeability of the stub shafts by sliding the actuating sleeve on the output shaft but also provides a clear indication of the rotating speed of the stub shaft by aligning different speed indicating formalities on the sleeve with the speed sensor.

Thus the drive line can easily indicate whether the stub shaft is rotating at or around 540 or 1000 r.p.m and provide a warning if the implement is rotating at the wrong speed or at a speed which is deviating from the design speed of 540 or 1000 r.p.m by more than a predetermined amount.

In a preferred arrangement the sleeve projects from a tractor gear box housing and is biased outwardly relative to the housing towards the first retaining position, the sleeve being displaceable against the bias into the housing towards the second retaining position and the third releasing position.

The first and second PTO shaft speed indicating formations preferably comprise a first series of formations formed at a first axial location on an indicating sleeve which surrounds and is moveable axially and rotationally with the actuating sleeve and a second series of formations formed at a second axial location on the indicating sleeve.

Conveniently one series of formations comprises a first series of slots extending axially from a free end of the indicating sleeve and the second series of formations comprises axial extensions of some of the first series of slots.

The present invention will now be described by way of example only with reference to the accompanying drawings in which.

Figure 1:
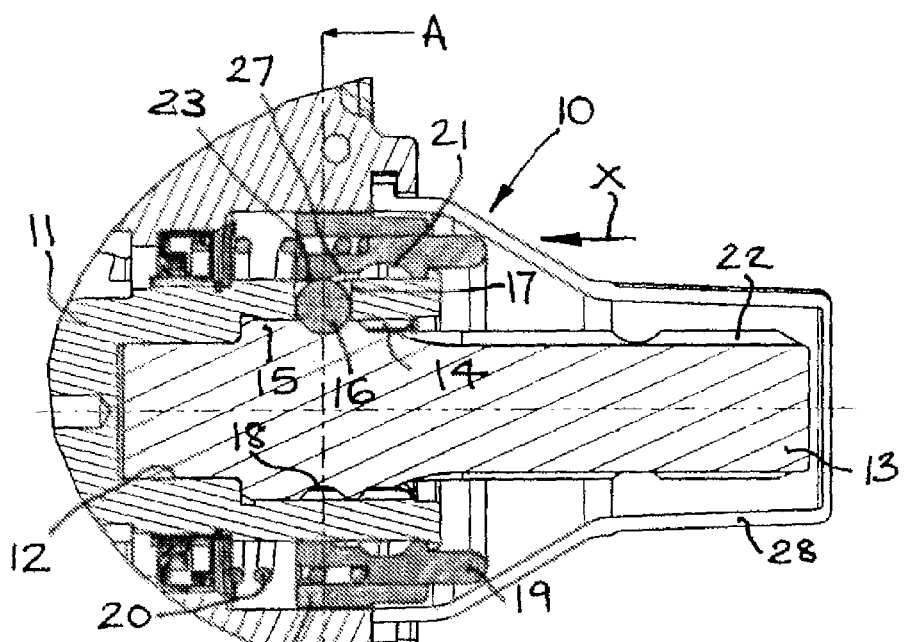
FIG. 1 shows an axial section On the line C-C of FIG. 2 through a tractor PTO drive line in accordance with the present invention with a six spline 540 r.p.m stub shaft retained in position.

Referring to the drawings the tractor PTO drive line 10 has an output shaft 11 with a socket 12 in which a PTO stub shaft 13 is received. The socket 12 is provided with splines 14 which mesh with splines 15 on the stub shaft to drive the stub shaft 13 from the output shaft 11.

The stub shaft 13 is retained in the socket 12 by retaining members in the form of steel balls 16 which are radially moveable in bores 17 in the output shaft 11. FIG. 1 shows the balls 16 in their retaining position in which they engage an annular groove 18 formed in the stub shaft 13. The balls 16 are held in the retaining position by an actuating sleeve 19 which is biased towards the FIG. 1 retaining position by a coil spring 20.

Figure 1A:
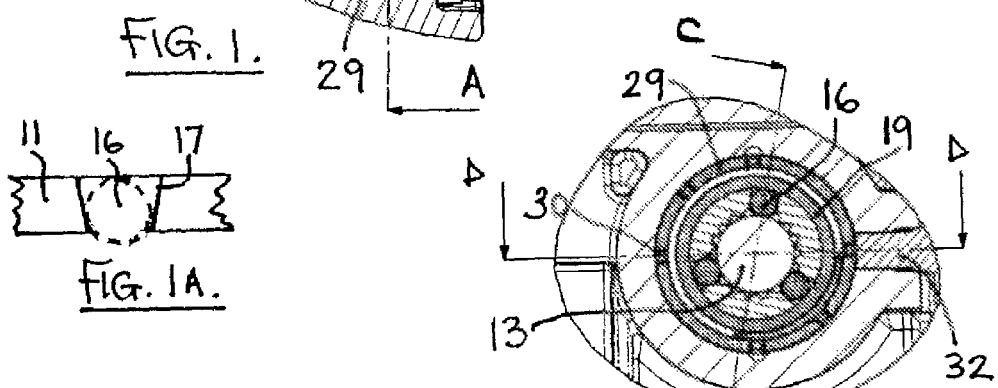
FIG. 1A shows a fragmentary view of a ball retainer used in the arrangement of FIG. 1.
Figure 2:
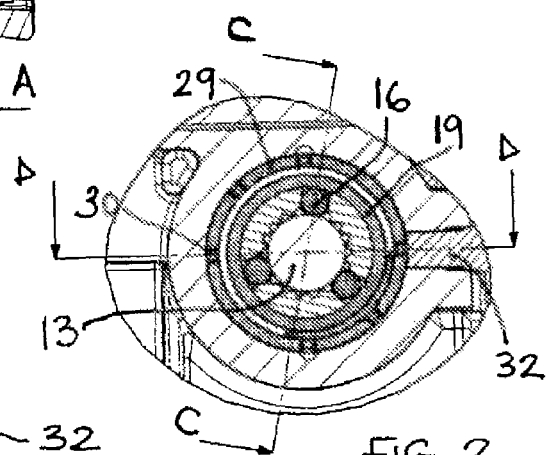
FIG. 2 show a radial section on line A-A of FIG. 1.
Figure 4:
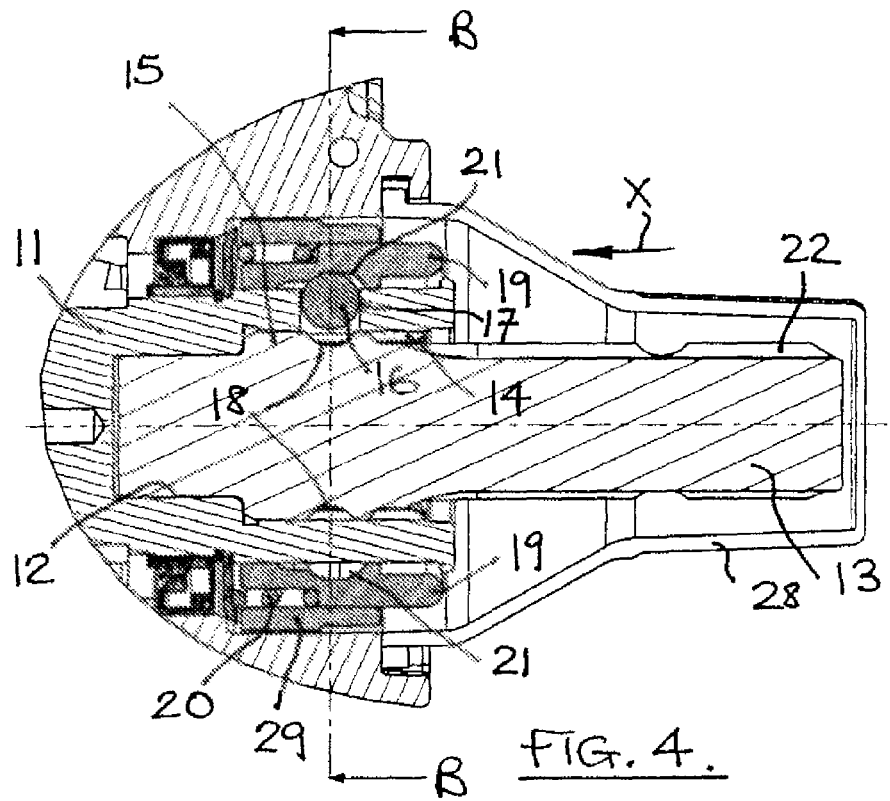
FIG. 4 shows an axial section on the line E-E of FIG. 5 of the drive line of FIG. 1 with its retaining member actuating sleeve in its releasing position.
Figure 5:
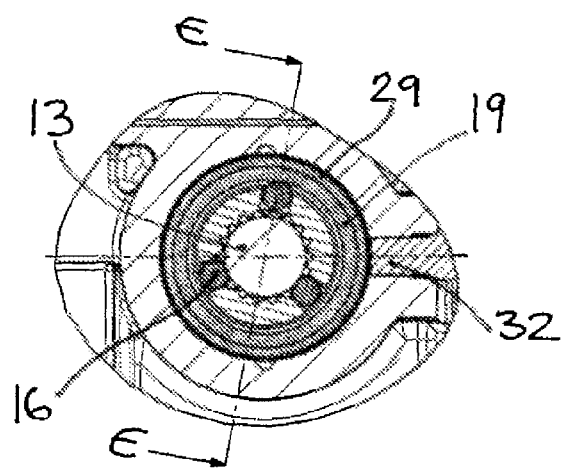
FIG. 5 is a radial section on the line B-B of FIG. 4.

FIG. 1a shows the balls 16 housed in the bores 17 which taper (as shown an exaggerated scale in FIG. 1a) in order that the balls 16 remain in the bores 17. In order to release the stub shaft 13 from the output shaft socket 12 the actuating sleeve 19 is pushed inwardly as indicated by the arrow X in FIG. 1 to the position shown in FIG. 4 when a groove 21 in the sleeve 19 are aligned with the bores 16 thus allowing the balls to move radially outwardly to disengage the groove 18 so that the stub shaft can be withdrawn from the output shaft.

The stub shaft 13 shown in FIG. 1 is of the type conventionally designed to be driven at 540 r.p.m and is provided with six external drive splines 22. When the stub shaft is retained in the socket 12 the inner portion 23 of the sleeve 19 overlays the balls 16 thus retaining the stub shaft in the socket 12.

Figure 6:
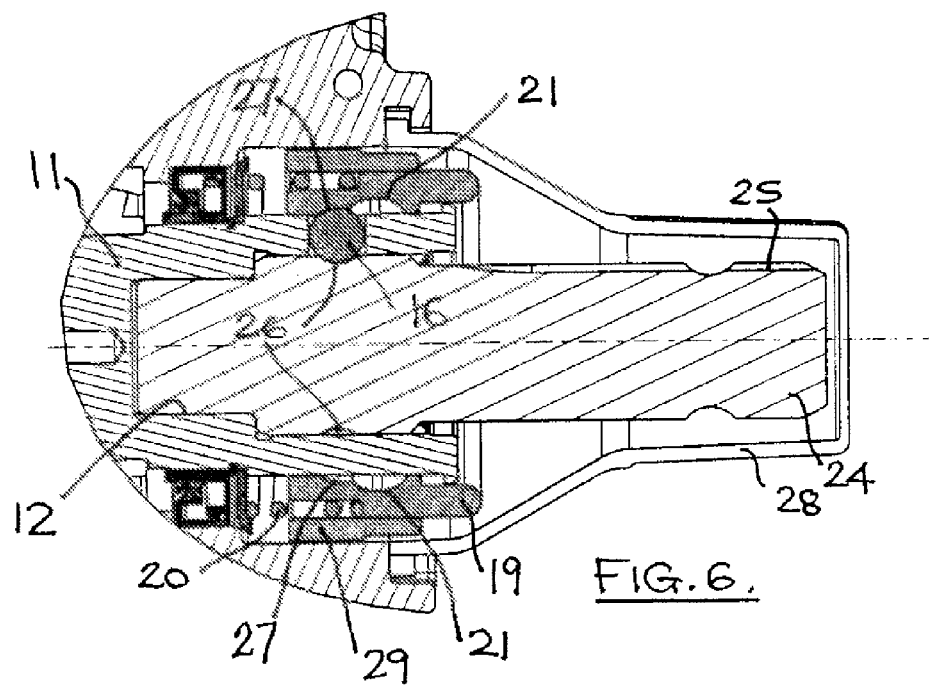
FIG. 6 shows an axial section of the drive line of FIG. 1 with a twenty-one spline 1000 r.p.m stub shaft retained in position.

FIG. 6 shows the drive line fitted with a stub shaft 24 designed to be driven at 1000 r.p.m and provided with twenty-one external drive splines 25. This stub shaft has an annular groove 26 which is shallower than the annular groove 18 provided in the stub shaft 13 and thus causes the retaining balls 16 to be further radially outward when retaining shaft 24 than when retaining shaft 13. Thus spring 20 biases the sleeve 19 to the FIG. 6 position in which the further retaining groove 27 in the sleeve 19 overlie the balls 16 to retain the stub shaft 24 in the socket 12. This stub shaft can again be released by pushing the sleeve 19 inwardly in the direction of the arrow X so that the groove 21 overlie the balls 16.

The drive line is also provided with a removable PTO stub shaft cover 28 which is preferably fitted for safety reasons when the PTO shaft is not in use.

In accordance with the present invention the actuating sleeve 12 carries an indicating sleeve 29 which is axially moveable with sleeve 19.

Figure 10:
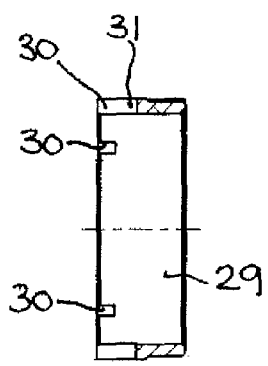
FIGS. 9 and 10 show sectional views on the lines F-F and G-G of FIG. 8.
Figure 8:
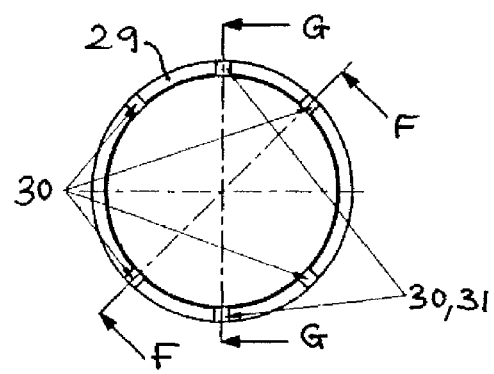
FIG. 8 shows an end view of a speed indicating sleeve used in a drive line in accordance with the present invention.
Figure 9:
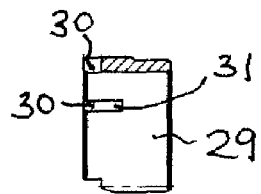

As can be best seen from FIGS. 8 to 10, the sleeve 29 includes a first series of six speed indicating formations in the form of axially extending slots 30 cut in the inner end 29a of the sleeve 29. A second series of two speed indicating formations is provided in the sleeve 29 by extending two of the slots 30 as indicated at 31 in FIGS. 9 and 10.

Figure 3:
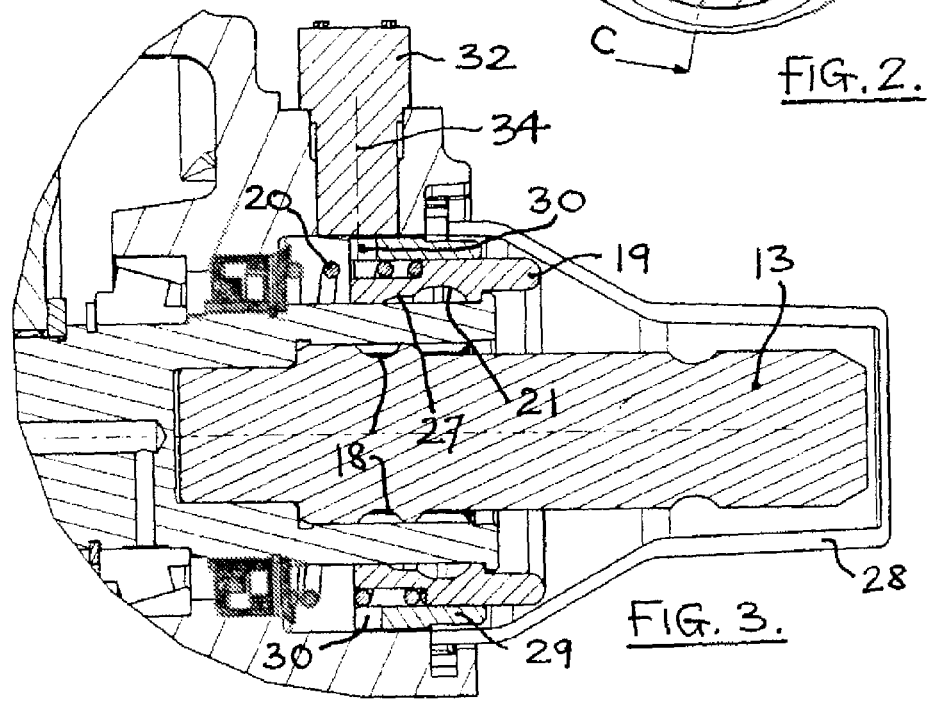
FIG. 3 shows a further axial section on the line D-D of FIG. 2 of the arrangement of FIG. 1 showing an associated stub shaft speed sensor.

A Hall effect speed sensor 32 is provided in the support housing 33 for the output shaft 11. As can be seen from FIG. 3, when the 540 r.p.m stub shaft 13 is retained in the socket 12 the first series of slots 30 is arranged to be generally opposite the centre line 34 of the sensor 32 so that the sensor detects the six slots as the stub shaft 13 is rotated thus communicating to an electronic control system connected with the sensor 32 that a 540 r.p.m stub shaft is fitted and providing an accurate indication of the speed of rotation of the stub shaft 13 so that a warning can be provided by the electronic control system if the stub shaft 13 is being driven at the wrong speed (e.g. 1000 r.p.m) or is being driven at a speed which is deviating from the desired 540 r.p.m by more than a predetermined amount.

Figure 7:
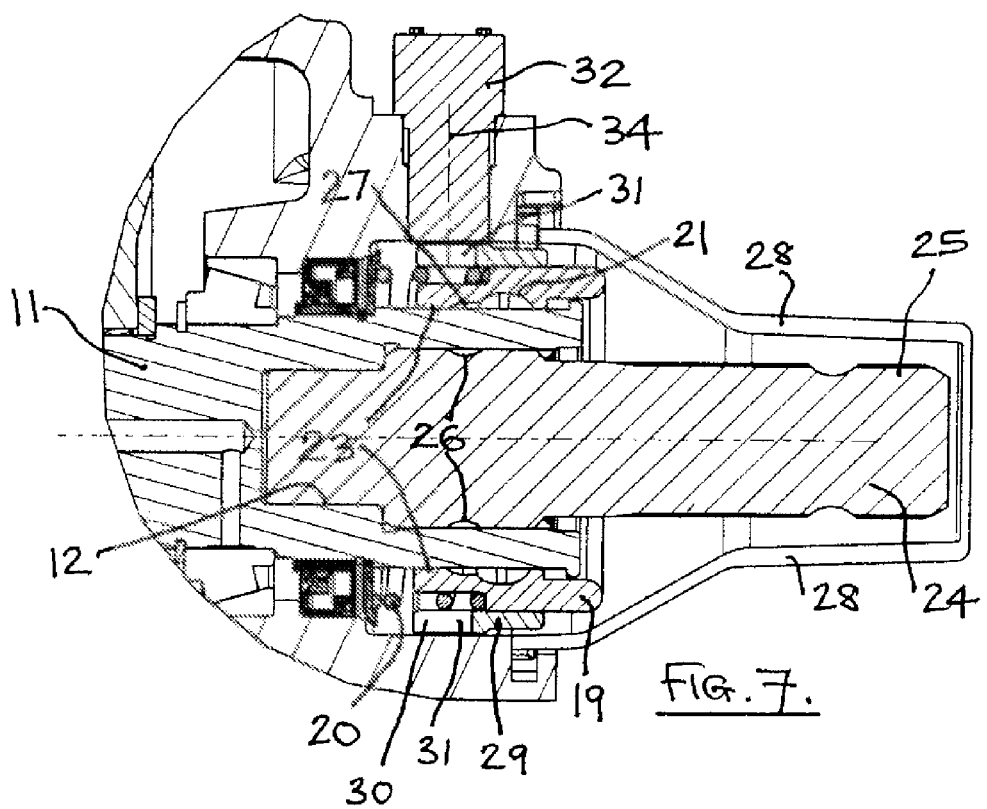
FIG. 7 shows a further axial section of the arrangement of FIG. 6 showing the associated stub shaft speed sensor.

FIG. 7 shows the position of the indicating sleeve 29 when the 1000 r.p.m stub shaft 24 is held in the socket 12. In this position the two longer shafts formed by the slot extensions 31 are located generally opposite the centre line 34 of the sensor 32 so that the sensor only detects the two longer slots as the stub shaft is driven thus telling the associated electronic control system that a 1000 r.p.m stub shaft is fitted and enabling the control system to provide the necessary warnings if the stub shaft is being driven at the wrong speed or is deviated from the design speed by more than a predetermined amount.

The present invention thus provides a PTO drive line in which the operative stub shaft can be easily changed and an indication is provided as to which stub shaft is fitted and the speed at which the stub shaft is being rotated so that the necessary warnings can be provided if necessary.

The invention claimed is:

1. A tractor PTO drive line having an output shaft with a socket within which a removeable PTO stub shaft is drivingly received, the stub shaft being retained in the socket by radially moveable retaining members housed in the output shaft and moveable between a radially inward retaining position in which the retaining members each projecting into the socket to engage a retaining formation in the stub shaft within the socket and a radially outward releasing position in which the retaining members are free to move radially outwardly relative to the socket to disengage the retaining formation and allow the stub shaft to be removed from the socket, the retaining members being moved between their retaining and releasing positions by an actuating sleeve which is axially slidable on the output shaft by a tractor operator between a first retaining position in which a first stub shaft designed to be driven at a first output speed is retained in position in the socket, a second retaining position in which a second stub shaft designed to be driven at a second output speed is retained in position in the socket, and a third releasing position in which the retaining members are allowed to move to their releasing positions, the sleeve carrying first and second PTO shaft speed indicating formations which are respectively designed to be aligned with a speed sensor when the sleeve is in its first and second stub shaft retaining positions respectively.

2. A PTO drive line according to claim 1 in which the sleeve projects from a tractor gear box housing and is biased outwardly relative to the housing towards the first retaining position, the sleeve being displaceable against the bias into the housing towards the second retaining position and the third releasing position.

3. A PTO drive line according to claim 1 in which the first and second PTO shaft speed indicating formations comprise a first series of formations formed at a first axial location on an indicating sleeve which surrounds and is moveable axially and rotationally with the actuating sleeve and a second series of formations formed at a second axial location on the indicating sleeve.

4. A PTO drive line according to claim 3 in which one series of formations comprises a first series of slots extending axially from a free end of the indicating sleeve and the second series of formations comprises axial extensions of some of the first series of slots.

5. A PTO drive line according to claim 1 in which the stub shafts are designed to be driven at first and second output speeds of 540 rpm and 1000 rpm respectively.

* * * * *